(12) United States Patent
Luckey, Jr. et al.

(10) Patent No.: US 10,428,411 B2
(45) Date of Patent: Oct. 1, 2019

(54) AIR QUENCHED HEAT TREATMENT FOR ALUMINUM ALLOYS

(71) Applicant: Ford Global Technologies, LLC, Dearborn, MI (US)

(72) Inventors: S. George Luckey, Jr., Dearborn, MI (US); Stephen Thomas Kozak, Northville, MI (US); Mark Keller, Birmingham, MI (US); Suranjeeta Dhar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 14/565,799

(22) Filed: Dec. 10, 2014

(65) Prior Publication Data

US 2016/0168676 A1 Jun. 16, 2016

(51) Int. Cl.
| | | |
|---|---|---|
| *C22F 1/05* | (2006.01) | |
| *C22C 21/08* | (2006.01) | |
| *C22F 1/00* | (2006.01) | |
| *B62D 29/00* | (2006.01) | |
| *C22C 21/00* | (2006.01) | |

(52) U.S. Cl.
CPC .............. *C22F 1/002* (2013.01); *B62D 29/00* (2013.01); *C22C 21/08* (2013.01); *C22F 1/00* (2013.01); *C22F 1/05* (2013.01)

(58) Field of Classification Search
CPC .............. C22F 1/002; C22F 1/04–057; C22C 21/00–18
See application file for complete search history.

(56) References Cited

U.S. PATENT DOCUMENTS

| 5,582,660 | A | * | 12/1996 | Erickson | ................. C22C 21/02 |
|---|---|---|---|---|---|
| | | | | | 148/417 |
| 7,029,543 | B2 | | 4/2006 | Bull et al. | |
| 8,636,855 | B2 | | 1/2014 | Wang et al. | |
| 8,721,811 | B2 | | 5/2014 | Lin et al. | |
| 2002/0017344 | A1 | | 2/2002 | Gupta et al. | |

(Continued)

FOREIGN PATENT DOCUMENTS

| CN | 102134671 A | 7/2011 |
|---|---|---|
| DE | 102011105447 A1 | 12/2012 |
| KR | 101147952 B1 | 5/2012 |

*Primary Examiner* — Lois L Zheng
(74) *Attorney, Agent, or Firm* — Raymond Coppiellie; Brooks Kushman P.C.

(57) ABSTRACT

Methods of processing an air-quenchable aluminum alloy component are provided. The method may include solution heat treating the component, air-quenching the component, and artificially aging the component to a yield strength of at least 200 MPa. The air-quenching may include cooling at a rate of 6° C./s to 25° C./s. The solution heat treatment may include heat treating the component at a temperature of 520° C. to 540° C. and the artificial aging step may include heat treating the component at 235° C. to 255° C. for 0.5 to 2 hours. The disclosed methods may produce a high strength (e.g., over 200 MPa) and high bendability (e.g., r/t ratio up to 0.3) component that does not significantly distort during the quenching process. The disclosed methods may be used to produce structural components having complex shapes, such as multiple, non-coplanar mating surface, while staying within predetermined tolerances.

17 Claims, 9 Drawing Sheets

(56) References Cited

U.S. PATENT DOCUMENTS

| | | |
|---|---|---|
| 2002/0121319 A1 | 9/2002 | Chakrabarti et al. |
| 2004/0140026 A1 | 7/2004 | Kamat et al. |
| 2005/0211350 A1 | 9/2005 | Unal et al. |
| 2006/0000094 A1 | 1/2006 | Garesche et al. |
| 2012/0152416 A1 | 6/2012 | Foster et al. |
| 2013/0319585 A1 | 12/2013 | Parson et al. |

* cited by examiner

| | METRICS | YS (MPa) | HARDNESS (Rb) | 32" BEND RATING (SCALE 0-6) |
|---|---|---|---|---|
| BASELINE | SHT: 530C FOR 2 HRS<br>QUENCH: WATER<br>AA: 200C FOR 6HRS | 230 | ~35<br>(25-45) | TYPICAL 2's |
| STILL AIR QUENCH | SHT: 530C FOR 2HRS<br>QUENCH: STILL AIR<br>NA: 3 DAYS | 67 | -54.8 | ALL 2's |
| | SHT: 530C FOR 2HRS<br>QUENCH: STILL AIR<br>AA: 180C FOR 6HRS | 135 | -5.0 | ALL 2's |
| LOW VELOCITY AIR QUENCH | SHT: 530C FOR 2HRS<br>QUENCH: LV AIR (~2C/s)<br>AA: 180C FOR 6HRS | 255 | 48.5 | ALL 6's |
| | SHT: 530C FOR 2HRS<br>QUENCH: LV AIR (~2C/s)<br>AA: 200C FOR 5HRS | 192 | 18.8 | ALL 2's |
| | SHT: 530C FOR 2HRS<br>QUENCH: LV AIR (~2C/s)<br>AA: 180C FOR 5 HRS + 225C FOR 3 HRS | 213 | 32.2 | 2,2,3 |

FIG. 10

| SOLUTION HEAT TREATMENT | | QUENCH DELAY | QUENCH | NATURAL AGE | ARTIFICIAL AGE | | | AVG. YIELD STRENGTH (MPa) | | AVG. HARDNESS (Rb) | | AVG. BEND RATINGS FOR 0.032" MANDREL | |
|---|---|---|---|---|---|---|---|---|---|---|---|---|---|
| TEMPERATURE (C) | TIME (HRS) | TIME (SEC) | TYPE | TIME (HRS) AT ROOM TEMPERATURE | AA TEMPERATURE (C) | AA TIME (HRS) | | AA TIME LOW | AA TIME HIGH | AA TIME LOW | AA TIME HIGH | AA TIME LOW | AA TIME HIGH |
| 530 | 2.5 | 10 | WATER | 24 | 230 | 4 | 8 | 232.1 | 211.0 | 34.8 | 30.9 | 2.4 | 2.2 |
| 530 | 1.5 | 10 | AIR (LOW VELOCITY) | 24 | 180C FOR 6 HRS + 225C | 4 | 8 | 195.5 | 185.0 | 27.9 | 23.1 | 2 | 2.2 |
| 530 | 1.5 | 10 | AIR (HIGH VELOCITY) | 24 | 180C FOR 6 HRS + 225C | 4 | 8 | 227.9 | 221.5 | 37.4 | 33.1 | 3 | 2.6 |
| 530 | 1.5 | 10 | AIR (LOW VELOCITY) | 24 | 246 | 2 | 4 | 158.2 | 153.2 | 5.9 | 8.2 | 1 | 1 |
| 530 | 1.5 | 10 | AIR (HIGH VELOCITY) | 24 | 246 | 2 | 4 | 194.6 | 186.0 | 23.5 | 19.9 | 2 | 2 |

FIG. 11

| SOLUTION HEAT TREATMENT | | QUENCH DELAY | QUENCH | NATURAL AGE | ARTIFICIAL AGE | | | AVG. YIELD STRENGTH (MPa) | | AVG. HARDNESS (Rd) | | AVG. BEND RATINGS FOR 0.032" MANDREL | | |
|---|---|---|---|---|---|---|---|---|---|---|---|---|---|---|
| TEMPERATURE (C) | TIME (HRS) | TIME (SEC) | TYPE | TIME (HRS) AT ROOM TEMPERATURE | AA TEMPERATURE (C) | AA TIME (HRS) | | AA TIME LOW | AA TIME HIGH | AA TIME LOW | AA TIME HIGH | AA TIME LOW | AA TIME HIGH | rt |
| 530 | 1.5 | 10 | AIR (LOW VELOCITY) | 24 | 180C FOR 6 HRS + 225C | 4 | 6 | 195.5 | 163.0 | 27.9 | 23.1 | 2 | 2.2 | <0.27 |
| 530 | 1.5 | 10 | AIR (HIGH VELOCITY) | 24 | 180C FOR 6 HRS + 225C | 4 | 6 | 227.9 | 221.6 | 37.4 | 33.1 | 3 | 2.6 | <0.27 |
| 530 | 1.5 | 10 | AIR (HIGH VELOCITY) | 24 | 180C FOR 6 HRS + 225C | 4 | | 233.2 | | 33.0 | | 3.1 | | <0.27 |
| 530 | 1.5 | 10 | AIR (HIGH VELOCITY) | 24 | 180C FOR 6 HRS + 225C | 4 | | 227.6 | | 36.0 | | 3.7 | | <0.27 |
| 530 | 1.5 | 10 | AIR (HIGH VELOCITY) | 24 | 180C FOR 6 HRS + 225C | 4 | | 229.8 | | 35.1 | | 3.0 | | <0.27 |
| 530 | 1.5 | 10 | AIR (HIGH VELOCITY) | 24 | 180C FOR 6 HRS + 225C | 4 | | 221.2 | | 36.9 | | 3.1 | | <0.27 |
| 530 | 1.5 | 10 | AIR (HIGH VELOCITY) | 24 | 180C FOR 6 HRS + 225C | 4 | | 226.4 | | 37.2 | | 4.0 | | <0.27 |
| 530 | 1.5 | 10 | AIR (HIGH VELOCITY) | 24 | 180C FOR 6 HRS + 225C | 4 | | 230.7 | | 36.3 | | 3.3 | | <0.27 |

FIG. 12

| SOLUTION HEAT TREATMENT | | QUENCH DELAY | QUENCH | NATURAL AGE | ARTIFICIAL AGE | | AVG. YIELD STRENGTH (MPa) | AVG. HARDNESS (Rb) | AVG. BEND RATINGS FOR 0.032" MANDREL |
|---|---|---|---|---|---|---|---|---|---|
| TEMPERATURE (C) | TIME (HRS) | TIME (SEC) | TYPE | TIME (HRS) AT ROOM TEMPERATURE | AA TEMPERATURE (C) | AA TIME (HRS) | | | |
| 530 | 3 | 10 | AIR (LOW VELOCITY) | | 246 | 1 | 172.5 | 14.84 | 2 |
| 530 | 1.5 | 10 | AIR (LOW VELOCITY) | 24 | 246 | 2 | 133.2 | 6.9 | 1 |
| 530 | 1.5 | 10 | AIR (LOW VELOCITY) | 24 | 246 | 4 | 155.2 | 6.2 | 1 |
| 530 | 3 | 10 | AIR (HIGH VELOCITY) | | 246 | 1 | 218.0 | 34.1 | 2.0 |
| 530 | 1.5 | 10 | AIR (HIGH VELOCITY) | 24 | 246 | 2 | 194.6 | 23.5 | 2 |
| 530 | 1.5 | 10 | AIR (HIGH VELOCITY) | 24 | 246 | 4 | 180.0 | 19.9 | 2 |

FIG. 13

| SOLUTION HEAT TREATMENT | | QUENCH DELAY | AIR QUENCH | NATURAL AGE | ARTIFICIAL AGE | | AVG. YIELD STRENGTH | | AVG. HARDNESS (Rb) | AVG. BEND RATINGS FOR 0.032" MANDREL |
|---|---|---|---|---|---|---|---|---|---|---|
| TEMPERATURE (C) | EXPOSURE TIME (HRS) | TIME (SEC) | RATE (C/s) (500C TO 200C) | TIME (HRS) AT ROOM TEMPERATURE | AA TEMPERATURE (C) | AA TIME AT TEMPERATURE (HRS) | (MPa) | σ | | |
| 530 | 3.5 | NONE | 3.7 | < 24 HRS | 246 | 1 | 200.5 | 8.2 | 23.3 | 2.5 |
| 530 | 3.5 | NONE | 0.4 | < 24 HRS | 246 | 1 | 213.8 | 1.1 | 23.3 | 2.3 |
| 530 | 3.5 | NONE | 0.3 | < 24 HRS | 246 | 1 | 230.1 | 13.0 | 20.0 | 2.5 |

FIG. 14

AIR QUENCHED HEAT TREATMENT FOR ALUMINUM ALLOYS

TECHNICAL FIELD

The present disclosure relates to methods of air quenching and heat treating aluminum alloys and aluminum components formed therefrom.

BACKGROUND

One approach to reducing vehicle weight in automotive design is with aluminum intensive vehicles (AIVs). AIVs have often been based on the unibody design of steel vehicle architectures, which are assemblies of stamped sheet components. Automotive AIV design has focused primarily on the 5xxx and 6xxx series aluminum sheet, as they can be shaped and processed by methods consistent with those already used in automotive manufacturing of steel sheet (e.g., sheet stamping, automated assembly, paint process). These alloys may have strengths equivalent to the mild steel sheet generally used in steel vehicle platforms. The 6xxx series aluminum alloys may experience improved mechanical strength properties when certain heat treatment processes are performed. Aluminum-zinc alloys of the 7xxx series may achieve yield strengths similar to those of high strength steels, if they are age hardened. However, 7xxx series alloys may be received in a variety of tempers, some of which may be difficult to process and require further heat treatment before the age hardening process.

SUMMARY

In at least one embodiment, a method of processing an air-quenchable aluminum alloy component is provided. The method may include solution heat treating the component, air-quenching the component at a rate of 6° C./s to 25° C./s, and artificially aging the component to a yield strength of at least 200 MPa.

The artificially aging step may include artificially aging the component to have an r/t ratio of at most 0.3. The solution heat treating step may include heat treating the component at 520° C. to 540° C. In one embodiment, no liquid is used to quench the component. The air-quenching step may include air-quenching the component at a rate of 8° C./s to 15° C./s. In one embodiment, the air quenching step is performed through at least a temperature range of 475° C. to 290° C.

The artificially aging step may include heat treating the component at 235° C. to 255° C. for 0.5 to 2 hours. The artificially aging step may include heat treating the component at 240° C. to 250° C. for 0.5 to 1.5 hours. In one embodiment, the air-quenchable aluminum alloy is one of 6061, 6063, 6022, 6008, 6451, 6005, 7003, and 7005. The air-quenchable aluminum alloy component may include multiple, non-coplanar mating surfaces. The air-quenching step may distort the component by 0.7 mm or less. The method may also include stamping the component in a progressive die prior to the solution heat treating step.

In at least one embodiment, a method of processing an air-quenchable 6xxx series aluminum alloy component is provided. The method may include solution heat treating the component at a temperature from 520° C. to 540° C., air-quenching the component through at least a temperature range of 475° C. to 290° C., and artificially aging the component at a temperature of 235° C. to 255° C. for 0.5 to 2 hours to a yield strength of at least 200 MPa.

The air-quenching step may include air-quenching the component at a rate of 6° C./s to 25° C./s. In one embodiment, the artificially aging step includes artificially aging the component to have an r/t ratio of at most 0.3. The air-quenchable 6xxx series aluminum alloy component may be a structurally reinforcing member having multiple, non-coplanar mating surfaces.

In at least one embodiment, a method of forming a structural vehicle component is provided. The method may include stamping a sheet of an air-quenchable aluminum alloy in a progressive die to form a component having at least two non-coplanar surfaces, solution heat treating the component, air-quenching the component at a rate of 6° C./s to 25° C./s, and artificially aging the component to a yield strength of at least 200 MPa and an r/t ratio of at most 0.3.

The solution heat treating step may include heat treating the component at 520° C. to 540° C. The air quenching step may be performed through at least a temperature range of 475° C. to 290° C. In one embodiment, the artificially aging step includes heat treating the component at 235° C. to 255° C. for 0.5 to 2 hours.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aluminum alloys are generally identified by a four-digit number, wherein the first digit generally identifies the major alloying element. Additional numbers represented by the letter "x" in the series designation define the exact aluminum alloy. For example, the major alloying element of 5xxx series is magnesium and for 6xxx series they are magnesium and silicon. The 5xxx and 6xxx series aluminum alloys may generally be shaped and processed by methods consistent with those of mild steel sheets. The 7xxx series, which generally have high strengths, have aluminum and zinc as the major alloying elements.

Examples of specific 6xxx series alloys may include 6061, which may have a composition including 0.4-0.8% silicon, up to 0.7% iron, 0.15-0.40% copper, up to 0.15% manganese, 0.8-1.2% magnesium, 0.04-0.35% chromium, up to 0.25% zinc, up to 0.15% titanium, and other elements up to 0.05% each (0.15% total), all percentages by weight with the balance being aluminum. Numerous automotive components may be formed from 6061 aluminum, such as brackets, body components, fasteners, and others. Another specific example of a 6xxx series alloy may be 6111, which may have a composition including 0.5-1% magnesium, 0.6-1.1% silicon, 0.5-0.9% copper, 0.1-0.45% manganese, up to 0.4% iron, up to 0.15% zinc, up to 0.1% chromium, up to 0.1% titanium and other elements up to 0.05% each (0.15% total), all percentages by weight with the balance being aluminum. Numerous automotive components may be formed from 6111 aluminum, such as body panels, pillars, and others. Components including 6111 aluminum may require higher yield strength than those including 6061 aluminum. Other specific 6xxx series alloys are known in the art, such as 6009, 6010, 6016, 6022, 6053, 6063, 6082, 6262, 6463, or others. In 7xxx series alloys, the major alloying elements are added to introduce specific properties such as strength and toughness through precipitation hardening. The minor alloying elements indirectly affect properties as grain refiners/pinners. The major alloying elements in 7xxx series are Zn, Mg, and Cu which have solid solubility for solution heat treatment. The minor alloys elements have low solid solubility, and thus support grain refinement during solution heat treatment and quench.

6xxx and 7xxx series aluminum alloys may be age hardened (precipitation hardened) to increase their strength and/or toughness. Age hardening is preceded by a solution heat treatment (or solutionizing) and quench of the aluminum alloy material. A solution heat treatment (SHT) generally includes heating the alloy to at least above its solvus temperature and maintaining it at the elevated temperature until the alloy forms a homogeneous solid solution or a single solid phase and a liquid phase. The temperature at which the alloy is held during solutionizing is known as the solution temperature. For example, the solution temperature for a 6xxx series aluminum alloy may be approximately 510° C. to 580° C. and the solution treatment may last from about 1 minute to 5 hours depending on the efficiency of furnace system and form of the aluminum being solution heat treated (e.g., sheet coil or sheet stampings). The solution temperature for a 7xxx series aluminum alloy may be approximately 460° C. to 490° C. and the solution treatment may last from about 5 to 45 minutes. However, any suitable solution temperature and/or time may be used for a given aluminum alloy. The solution temperature may be the temperature at which a substance is readily miscible. Miscibility is the property of materials to mix in all proportions, forming a homogeneous solution. Miscibility may be possible in all phases; solid, liquid and gas.

Following the solution heat treatment, a quenching step is performed in which the alloy is cooled to below the solvus temperature to form a supersaturated solid solution. In conventional quenching procedures, the quenching involves a rapid cooling using a liquid quenching medium (e.g., water or oil). Quench rates in liquid quenching typically exceed several hundred ° C./s (e.g. 800° C./s). Due to the rapid cooling, the atoms in the alloy do not have time to diffuse long enough distances to form two or more phases in the alloy. The alloy is therefore in a non-equilibrium state. The quench may be performed until the alloy is at a cool enough temperature that the alloy stays in a supersaturated state (e.g., diffusion is significantly slowed), such as about 290° C. The alloy may then be air cooled or otherwise cooled at a rate slower than the quench rate until a desired temperature is reached. Alternatively, the quench may be performed to a lower temperature, such as below 100° C. or down to about room temperature.

Age hardening includes heating and maintaining the alloy at an elevated temperature at which there are two or more phases at equilibrium. The supersaturated alloy forms fine, dispersed precipitates throughout as a result of diffusion within the alloy. The precipitates begin as clusters of atoms, which then grow to form GP zones, which are on the order of a few nanometers in size and are generally crystallographically coherent with the surrounding metal matrix. As the GP zones grow in size, they become precipitates, which strengthen the alloy by impeding dislocation movement. Since the precipitates are very finely dispersed within the alloy, dislocations cannot move easily and must either go around or cut through the precipitates in order to propagate.

Five basic temper designations may be used for aluminum alloys which are; F—as fabricated, O—annealed, H—strain hardened, T—thermally treated, and W—as quenched (between solution heat treatment and artificial or natural aging). The as-received raw material for the disclosed solutionizing and age hardening processes may initially have any of the above temper designations. The temper designation may be followed by a single or double digit number for further delineation. An aluminum alloy with a T6 temper designation may be an alloy which has been solution heat treated and artificially aged, but not cold worked after the solution heat treatment (or such that cold working would not be recognizable in the material properties). T6 may represent the point of peak age yield strength along the yield strength vs. time and temperature profile for the material. A 6xxx series aluminum alloy having a T6 temper may have a yield strength of at least 240 MPa. For example, 6061 at a T6 temper may have a yield strength of about 275 MPa and 6111 at a T6 temper may have a yield strength of about 300 MPa. A T7 temper may designate that a solution heat treatment has occurred, and that the material was artificially aged beyond the peak age yield strength (over-aged) along the yield strength vs. time and temperature profile. A T7 temper material may have a lower yield strength than a T6 temper material, but the T7 temper may improve other properties, such as increased toughness compared to the T6 temper. A T4 temper is similar to a T7 in that it has lower strength, but higher toughness than a T6 temper, except that it is under-aged relative to the peak yield strength (e.g., T6), instead of over-aged. A 7xxx series aluminum alloy part with a T6 temper may have a YS of at least 500 MPa, while, a 7xxx series aluminum alloy with a T7x may have a YS of at least 450 MPa.

Figure 1:
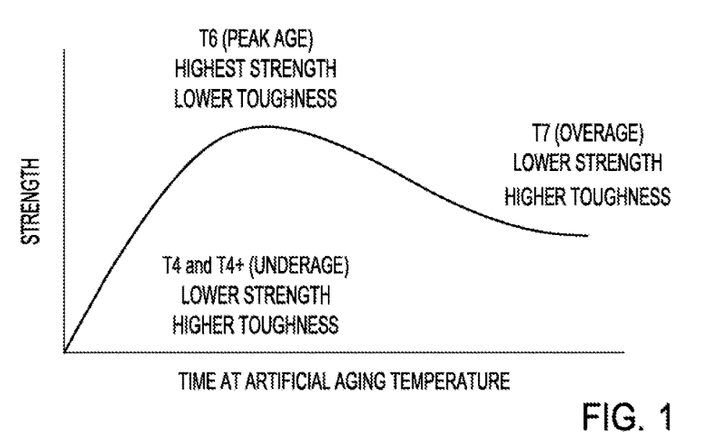
FIG. 1 is a schematic graph of strength versus artificial aging time showing several tempering stages of aluminum alloys.

The relative strengths and toughness of 6xxx series aluminum alloys as a function of aging time are illustrated in FIG. 1. As discussed above, T6 represents peak aging and the highest yield strength, while T7 represents over-aging and reduced (but still improved) yield strength. The T4 temper is shown to the left of peak aging, and may have properties similar to T7 (e.g., reduced strength and increased toughness relative to T6), but represents under-aging rather than over-aging. Under-aging to a T4 temper can be difficult to control and repeat. Therefore, over-aging is typically a more robust and consistent process compared to under-aging.

To achieve a T6 temper in a 6xxx series alloy, a solution heat treatment and quench is performed, as described above, followed by an age hardening heat treatment. The standard age hardening heat treatment to achieve a T6 temper in a 6xxx alloy may be at a temperature of about 160° C. to 180° C. for 8 to 18 hours (generally, if the temperature is near the top of the range then the time is towards the bottom of the range, and vice versa). However, alloys having a T6 temper may not have the toughness or bendability required for some applications. In addition, it has been found that the rapid quenching involved with typical solution heat treatments and subsequent artificial aging can cause warping, distortion, and/or loss of dimensional control in certain components, such as large parts or those with relatively complicated geometries, for example, parts having multiple, non-coplanar mating surfaces.

It has been discovered that 6xxx and 7xxx series alloys having a T5 temper with good strength and toughness can be achieved in significantly less time than typical artificial aging processes. A T5 temper, as used in this disclosure, refers to an air quenched and artificially aged aluminum alloy. A T5 temper may generally fall between the T4 and T6 tempers shown in FIG. 1, and may therefore have a yield strength and toughness that is intermediate the T4 and T6 tempers. Components prepared according to the disclosed processes may be useful in numerous industries, including the automotive industry. For example, the components may be used in vehicles, such as cars, trucks, or SUVs. In one embodiment, the components may be used in a truck that is an AIV or has a substantially all-aluminum body. It has been found that by air quenching and aging at an increased temperature compared to typical age hardening processes, a T5 temper component with a high yield strength (e.g., over 200 MPa), good bendability (e.g., r/t<0.3), and no or minimal distortion (e.g., ≤0.7 mm) can be produced.

Figure 2:
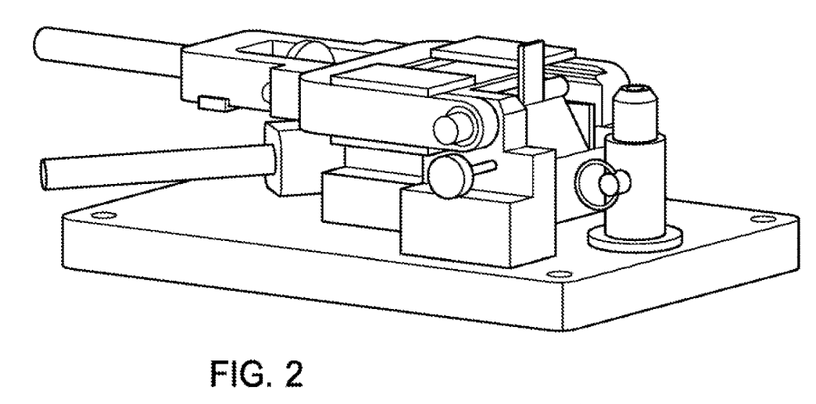
FIG. 2 is a photograph of a semi-guided wrap-bend tester, which may be used to test bendability of an aluminum alloy.
Figure 3:
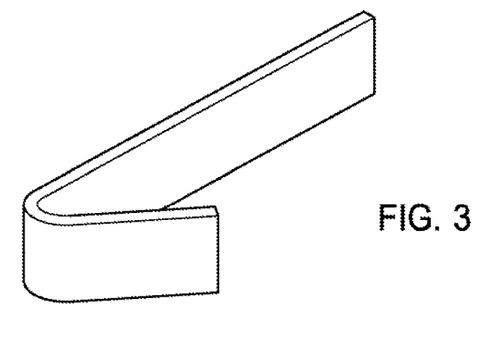
FIG. 3 is an example of a coupon tested using the wrap-bend tester of FIG. 2.

Bendability, as used in the present disclosure, may be quantified using an "r/t ratio," which is the ratio of the bend radius (r) to the sheet thickness (t). The smaller the r/t ratio, the more bendable the sheet is. An example of a piece of equipment used to measure bendability is shown in FIG. 2. The equipment shown is a semi-guided wrap-bend tester, which adheres to standards such as ASTM E290 and Ford Laboratory Test Method (FLTM) B114-02. Bendability may be defined and measured according to FLTM BB 114-02 and the r/t ratio may be calculated based on a prescribed bend rating. In at least one embodiment, the r/t ratio to failure may be calculated based on a bend rating of about 5 or more where a crack completely propagates across the width of the bent sample. The r/t to failure calculation may be considered a normalized, relative mechanical assessment of an aluminum alloy's toughness. An example of a coupon tested using the wrap-bend tester is shown in FIG. 3.

In at least one embodiment, the disclosed components may be formed of air-quenchable aluminum alloys, for example, air-quenchable 6xxx and 7xxx series alloys. Not all aluminum alloys are air-quenchable. In order to be air-quenchable, the alloy must remain supersaturated when cooled at rates corresponding to air quenching (e.g., the quench time required to cool the material from the solvus temperature to less than ~290° C. is small enough that solute does not form large, non-hardening precipitates at grain boundaries and/or intermetallics; thus limiting the hardenability of the material in subsequent aging heat treatments.) Air quench cooling rates may depend on several factors, such as the cooling conditions, the cooling equipment, and the component properties. In general, there may be a practical upper limit on air quenching cooling rates of about 35° C./s. If an alloy does not remain supersaturated during an air quench, a subsequent age hardening process cannot be performed. Whether an alloy is air-quenchable generally depends on the alloy composition. One indicator of air quenchability may be copper content. In general, aluminum alloys having less than about 0.4 wt % copper may be air-quenchable. Non-limiting examples of air-quenchable 6xxx series alloys may include 6061, 6063, 6022, 6008, 6451, and 6005. Non-limiting examples of air-quenchable 7xxx series alloys may include 7003 and 7005. In one embodiment, 6xxx and 7xxx series alloys having 0.4 wt % copper or less may be used to form the disclosed components.

Figure 4:
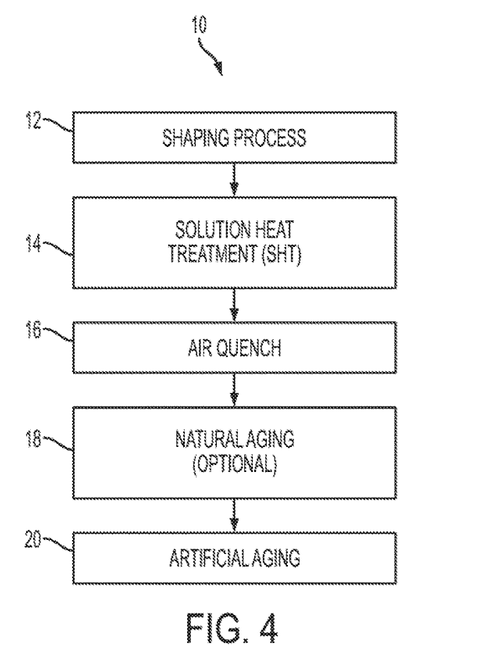
FIG. 4 is a flowchart of a method of forming or processing an air-quenchable aluminum alloy, according to an embodiment.

With reference to FIG. 4, a method or process 10 is shown for forming an aluminum alloy component having a T5 temper. At step 12, an optional shaping process may be performed. The shaping process may include a stamping process, in which the component may be punched and/or shaped. In one embodiment, the shaping process may include progressive stamping using a progressive stamping die. Progressive stamping generally includes multiple sheet metal stamping operations using more than one die or die station. Progressive stamping allows for complex components to be formed, such as those having multiple, non-coplanar mating surfaces. While process 10 is shown including the shaping step 12, the process is also applicable to unshaped components, such as sheet metal from a coil. In addition, the process 10 may begin with a component that has already been previously shaped, for example, using progressive stamping or other shaping processes.

At step 14, a solution heat treatment (SHT) is performed on an air-quenchable aluminum alloy component. The component may have been shaped in step 12 or may be an as-received component. The alloy may be an air-quenchable 6xxx or 7xxx series alloy, as described above. The alloy may have any of the basic temper designations described above, for example an O—temper (annealed) or an F—temper (as-fabricated). In one embodiment, for a 6xxx series alloy, the solution heat treatment temperature may be from 520° C. to 540° C., or any sub-range therein, for example 525° C. to 535° C. or about 530° C. (e.g., 530° C.±5° C.). The SHT temperature may be particularly important for an air quenching process. As described above, only certain alloys are air-quenchable. Similarly, only certain SHT temperatures may be suitable for air quenching of 6xxx series aluminum components. It has been discovered that a temperature of about 530° C.±5° C. (e.g., 525° C. to 535° C.) is particularly suitable for the SHT, and may be a requirement for some alloys. The SHT is dependent on each alloy's solvus temperature. A solution heat treatment temperature significantly above the solvus temperature may result in incipient melting. A SHT temperature significantly below solvus temperature may result in insufficient dissolution of the solute elements. Both conditions are detrimental to the mechanical properties of heat treatable aluminum alloys. The solution heat treatment time may be from 5 minutes to 5 hours, or any sub-range therein, for example, 0.5 to 5 hours, 1 to 4 hours, 2 to 4 hours, 2.5 to 3.5 hours, or about 3 hours. These time ranges are merely examples, however, and any SHT time that provides for complete solutionizing of the alloy may be suitable. The SHT may be performed using any suitable heating equipment, such as an oven or furnace, which may be stationary or continuous.

At step 16, an air quenching process is performed following the SHT. The time gap between the end of the SHT and the beginning of the quenching process may be referred to as the quench delay. In at least one embodiment, the quench delay may be 30 seconds or less, for example, up to 20 seconds or up to 15 seconds. Air quenching may include exposing the component(s) to air that has a temperature lower than the component. The air may be heated (e.g., above ambient temperature), cooled (e.g., below ambient temperature), or room/ambient temperature. The air may be ambient air, however, certain gases or gas mixtures may also be used. For example, a non-reactive gas or gas mixture may be used, such as argon and/or nitrogen. In one embodiment, the air/gas may be conditioned to increase or decrease the temperature to maintain a nominal temperature between 25° C. and 45° C. with a tolerance of less than 10° C. This temperature range may maintain consistent quench results independent of seasonal weather conditions. The air may be still or may be moving, for example, using a fan or HVAC system. In general, colder and/or faster moving air may provide increased quenching rates. Accordingly, high-powered, industrial scale fans (e.g., one or more 150 HP ducted fans) may be used to cool the components. While extremely cold or fast moving air may theoretically provide high cooling rates, the practical limit to air quenching may be about 30 to 35° C./s. Due to the relatively low thermal conductivity of air, extremely low cooling rates are also possible. For example, using low velocity airflow, cooling rates of several degrees per second are attainable.

In general, faster quenching of an age-hardenable aluminum alloy will result in a finished component that has a higher yield strength but lower toughness or bendability, compared to a slower quenched component of the same alloy. It has been discovered that for 6xxx series alloys, a certain threshold of yield strength and bendability (an indication of toughness) may be attained by air quenching within a certain range of cooling rates. In at least one embodiment, a 6xxx series component having a yield strength of at least 200 MPa and a bendability of $r/t \leq 0.3$ may be achieved using an air quench. In one embodiment, the air quench may have a cooling rate of 6° C./s to 25° C./s, or any sub-range therein. For example, the cooling rate may be from 6° C./s to 20° C./s, 7° C./s to 20° C./s, 8° C./s to 15° C./s, or 10° C./s to 15° C./s. It has been discovered that cooling rates in these ranges can provide a combination of high yield strength (e.g., at least 200 MPa) and good bendability (e.g., $r/t \leq 0.3$), which may allow the components to be used as structural components in certain applications, such as vehicles (e.g., Al-intensive trucks). Quenching rates that are outside of these ranges may produce components that are 1) strong, but not tough (e.g., quench rate too high); or 2) tough, but weak (e.g., quench rate too slow).

In at least one embodiment, the component(s) may be air quenched throughout the entire cooling temperature range, such as from the SHT temperature to the natural aging temperature or the start of the artificial aging temperature. The process 10 may include only air quenching and no other type of quenching, such as liquid quenching (e.g., water or oil). In one embodiment, the air quench step 16 may include quenching at the rates described above (e.g., 6° C./s to 25° C./s) over at least a certain temperature range, such as from the temperature of the component after the SHT (and any quench delay) to a lower threshold temperature at which the quenching process is substantially complete. For example, the air quench may be performed from at least when the components are at about 475° C. (e.g., after SHT and any quench delay) until they are about 290° C. Once the component(s) have reached a certain temperature, such as about 290° C., they may continue to be air quenched, but at a lower rate (e.g., using still or lower velocity air).

At step 18, the component may be naturally aged. Natural aging generally includes letting a component rest at, or close to, room temperature for a certain period of time. After a quench, natural aging may cause precipitation hardening to begin, although at a very slow pace. In the context of large-batch or continuous manufacturing, natural aging may occur as a result of production schedules and different batch sizes for different processes. For example, the SHT and quench process may have smaller batch sizes than a subsequent artificial aging process. Therefore, the first few batches of components that are solution heat treated may be set aside until the remaining batches are finished, such that they can all be artificially aged in one large batch. While the batches are waiting to be artificially aged, they are naturally aging. Since some components may wait longer than others before the artificial aging, the amount of natural aging for each component may vary according to which batch it is in, the size of the batches, or other factors. In at least one embodiment, the component(s) may be naturally aged for up to 24 hours. However, some components may naturally age for less time, such as 4, 8, 12, 16, or 20 hours, and some components may not be naturally aged at all (e.g., a final batch may by artificially aged directly after a SHT and quench). Naturally aging for longer than 24 hours is also possible, however, such relatively long aging processes may not be conducive to high-volume manufacturing processes or those where high levels of consistency between batches is very important.

At step 20, the component is artificially aged in order to precipitation harden the component. As described above, the standard age hardening heat treatment to achieve a T6 temper in a 6xxx alloy may be at a temperature of about 160° C. to 180° C. for 8 to 18 hours. However, the standard heat treatment is based on an alloy that is conventionally quenched (i.e., using a liquid quench). It has been discovered that a significantly shorter artificial aging heat treatment may used to produce an air-quenched, high strength and high bendability 6xxx series aluminum alloy. In at least one embodiment, the artificial aging (AA) or precipitation hardening process includes heat treating the component at a temperature of 235° C. to 255° C., for example 240° C. to 250° C. or about 246° C. (e.g., 246° C.±5° C.). The AA heat treatment may have a duration of 0.25 to 2 hours, for example, 0.5 to 2 hours, 0.5 to 1.5 hours or about 1 hour (e.g., 1 hour±0.5 hours).

The AA heat treatment is therefore significantly shorter than conventional AA heat treatments and is performed at a substantially higher temperature. The AA process may produce components having a yield strength of at least 200 MPa, for example, at least 210 MPa or at least 220 MPa. However, in addition to having increased yield strength, the components may also have good bendability and toughness, as evidenced by low r/t ratios. In one embodiment, the components may have an r/t ratio of less than 0.4, for example, 0.3 or less or 0.27 or less. Components produced using the process 10 may therefore have yield strengths of at least 200 MPa and r/t ratios of 0.3 or less. These properties make the components suitable for a wide range of applications, including some in which 6xxx series aluminum alloys were previously unable to be used. For example, the components may be used as structural components in vehicles (e.g., aluminum intensive cars and trucks). These components may be formed of thick gauge (e.g., 2-4 mm) aluminum sheet and may have complex shapes, such as multiple, non-coplanar mating surfaces.

Figure 5:
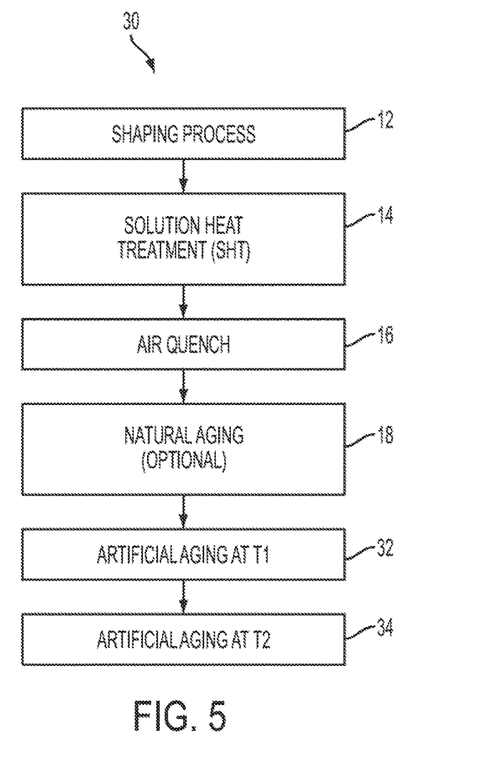
FIG. 5 is another flowchart of a method of forming or processing an air-quenchable aluminum alloy, according to an embodiment.

With reference to FIG. 5, another method or process 30 is shown for forming an aluminum alloy component having a T5 temper. The shaping 12, SHT 14, air quench 16, and natural aging 18 steps in the process 30 may be the same or similar to those described for process 10. Therefore, these processes have been similarly numbered and will not be discussed again in detail. However, it has been found that a two-step artificial aging process may also produce the same or similar properties as those described above with reference to process 10 (e.g., YS of at least 200 MPa and r/t ratio of up to 0.3). The two-step AA process may include a first heat treatment 32 at a first temperature, T1, and a second heat treatment 34 at a second, different temperature, T2. In one embodiment, the first temperature, T1, is lower than the second temperature, T2.

The first temperature, T1, may be from 170° C. to 190° C., for example from 175° C. to 185° C. or about 180° C. (e.g., 180° C.±5° C.). The first heat treatment 32 may have a duration of 4 to 8 hours, or any sub-range therein. In one embodiment, the first heat treatment 32 may have a duration of 5 to 7 hours or about 6 hours (e.g., 6 hours±0.5 hours). The second temperature, T2, may be higher than the first temperature, T1, such as 200° C. to 250° C., or any sub-range therein. In one embodiment, T2 may be from 210° C. to 240° C., 220° C. to 230° C., or about 225° C. (e.g., 225° C.±5° C.). In one embodiment, the second heat treatment 34 may have a duration of 3 to 10 hours, or any sub-range therein. For example, the second heat treatment 34 may have a duration of 4 to 8 hours. While the process 30 may have a longer duration than the process 10, it may provide components having similar properties. Therefore, in situations where longer processing times are not detrimental, the process 30 may be used to form high strength components having good bendability.

The disclosed processes for producing or forming aluminum components may be performed for a single component or for multiple components simultaneously, for example, in batches. The heat treatments (e.g., SHT and AA) may be performed in stationary or continuous ovens or furnaces. If multiple components are being processed, the components may be placed or arranged on racks. The components may remain on a single rack throughout the process, or they may be moved to different racks for one or more of the steps. If components are placed on a rack for the air quenching process, component orientation and spacing may be important to ensure adequate air flow between the components and over all of each component. In particular, if the components have a complex shape (e.g., multiple, non-coplanar mating surfaces), the components may be arranged on the rack such that airflow is not blocked. For example, airflow may be directed parallel to the larger surfaces, rather than perpendicular, such that air can flow between the components.

In addition to providing good yield strength and bendability properties, the disclosed processes including air quenching and AA heat treatments also reduce distortion in the quenched components, compared to liquid or other typical high cooling rate quenching techniques. Quench rates in liquid quenching typically exceed several hundred ° C./s (e.g. 800° C./s), which can cause significant deformation or distortion due to thermal stresses that are quickly imparted (e.g., thermal contraction). For example, the resultant magnitude of distortion at any given location on the part may be equal to greater than 0.7 mm from the target geometry surface for the part. The distortion may be increased or more problematic for larger and/or more complex components. For example, components having multiple mating surfaces may sustain distortion that is significant enough to cause misalignment or cause one or more components in a system to be outside acceptable tolerances.

Figure 6:
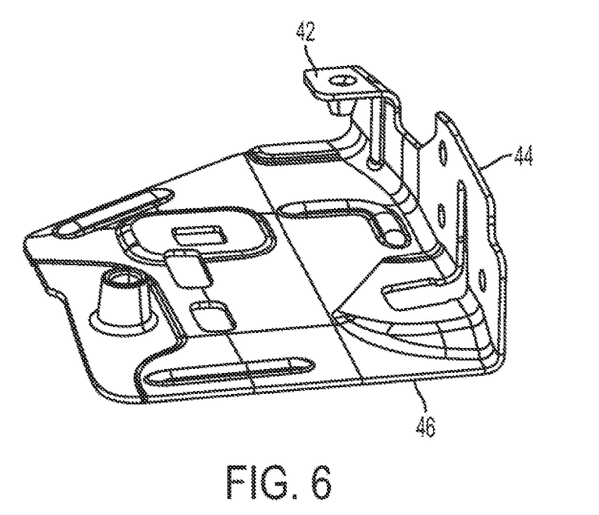
FIG. 6 is a front perspective view of a side door latch reinforcement component that may be produced according to the disclosed methods.
Figure 7:
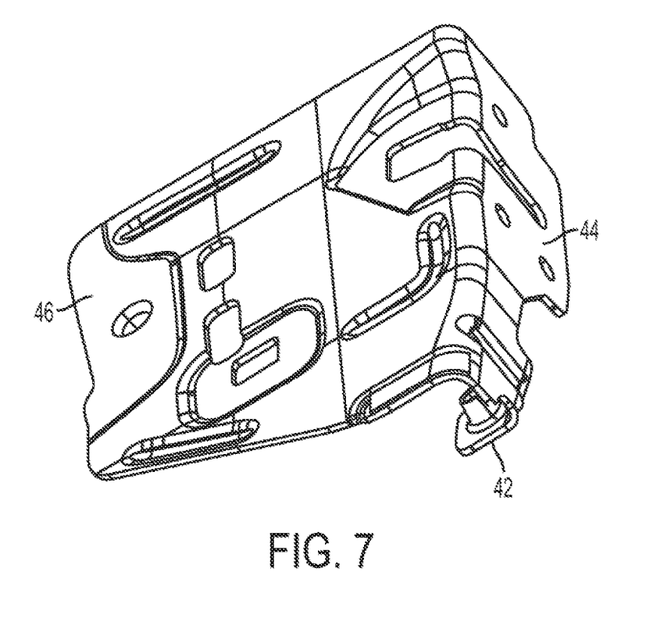
FIG. 7 is a rear perspective view the side door latch reinforcement component of FIG. 6.
Figure 8:
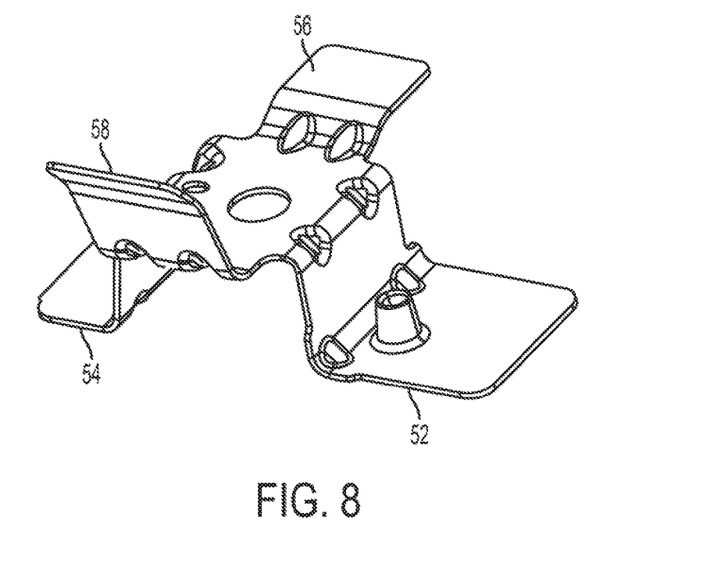
FIG. 8 is a perspective view of a floor pan reinforcement component that may be produced according to the disclosed methods.
Figure 9:
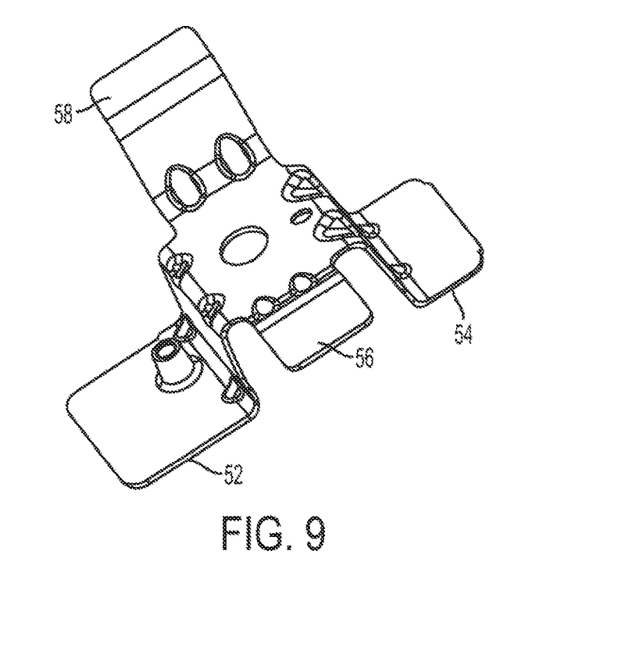
FIG. 9 is another perspective view the floor pan reinforcement component of FIG. 8.

The problem may be even more severe when a component has multiple, non-coplanar mating surfaces. Examples of two components having multiple, non-coplanar mating surfaces are shown in FIGS. 6-9. A side door latch reinforcement 40 is shown in FIGS. 6 and 7. The side door latch reinforcement 40 has multiple mating surfaces 42, 44, and 46, which are non-coplanar. If one or more of the mating surfaces 42, 44, or 46 are distorted beyond a certain acceptable tolerance or threshold, the other mating surfaces may be misaligned or out of specification. Misalignment may cause numerous problems, such as water/wind noise, visual misalignment, and door latching and/or sealing issues. A floor pan reinforcement 50 is shown in FIGS. 8 and 9. The floor pan reinforcement 50 has multiple mating surfaces 52, 54, 56, and 58. If one or more of the mating surfaces 52, 54, 56, or 58 are distorted beyond a certain acceptable tolerance or threshold, the other mating surfaces may be misaligned or out of specification. Distortion tolerances for mating surfaces may vary depending on the application, but in at least one embodiment, a distortion tolerance for a mating surface may be no more than ±1 mm, for example, less than or equal to ±0.7 mm. Components manufactured using the disclosed processes may include a plurality of mating surfaces that are each within the distortion tolerance.

Accordingly, a range of air quench rates and subsequent artificial age hardening processes have been discovered for aluminum alloys (e.g., 6xxx series) that avoid significant distortion, while still providing high yield strength and bendability/toughness. Air quenching is generally disfavored in the art for stamped sheet metal components, and particularly structural reinforcements, due to the relatively lower yield strengths it produces compared to liquid quenching. As described above, faster quench rates generally provide for a higher strength final component, after precipitation hardening. However, liquid-quenched parts are subject to high thermal stresses, which lead to significant distortion, particularly in parts having complex shapes. In addition, higher quench rate components also generally have lower bendability, making them not suitable for some structural applications. Conventional air quench and AA heat treatments of 6xxx series aluminum alloys do not provide the properties required (e.g., yield strength and bendability) for many structural applications. In addition, the heat treatments are lengthy and not conducive to high-volume manufacturing.

The disclosed air quench rates (e.g., 8° C. to 15° C.) allow for aluminum components having complex shapes to be cooled at a rate slow enough to avoid significant distortion. Components having multiple, non-coplanar mating surfaces may therefore be produced where each mating surface is within predetermined tolerance levels, such as ±0.7 mm. The disclosed quench rates also, however, allow for artificial aging to a yield strength of at least 200 MPa and r/t ratio of 0.3 or less. Accordingly, a specific range of air quench rates has been discovered that both reduces distortion but also allows for the production of components capable of being used in structural reinforcements.

The disclosed solution heat treatment (SHT) and artificial aging (AA) processes also facilitate the production of the high-performance components. Due to the unconventional use of air quenching of the components, the SHT and AA processes are adjusted and modified to account for the slower quench rates (compared to liquid quenching). The SHT temperature (e.g., 525° C. to 535° C.) provides a composition in the alloy that is air-quenchable and age-hardenable to the disclosed properties. Similarly, the disclosed AA temperatures and times precipitation harden the air quenched components to a yield strength of at least 200 MPa and an r/t ratio of 0.3 or less. Accordingly, the discovered processes include solution heat treatments, air quenching processes, and age hardening processes that are tailored to an air-quenched aluminum alloy (e.g., 6xxx or 7xxx series). The processes produce components having good mechanical properties and high dimensional stability, which makes the components suitable for applications such as structural reinforcements.

Examples

Figure 10:
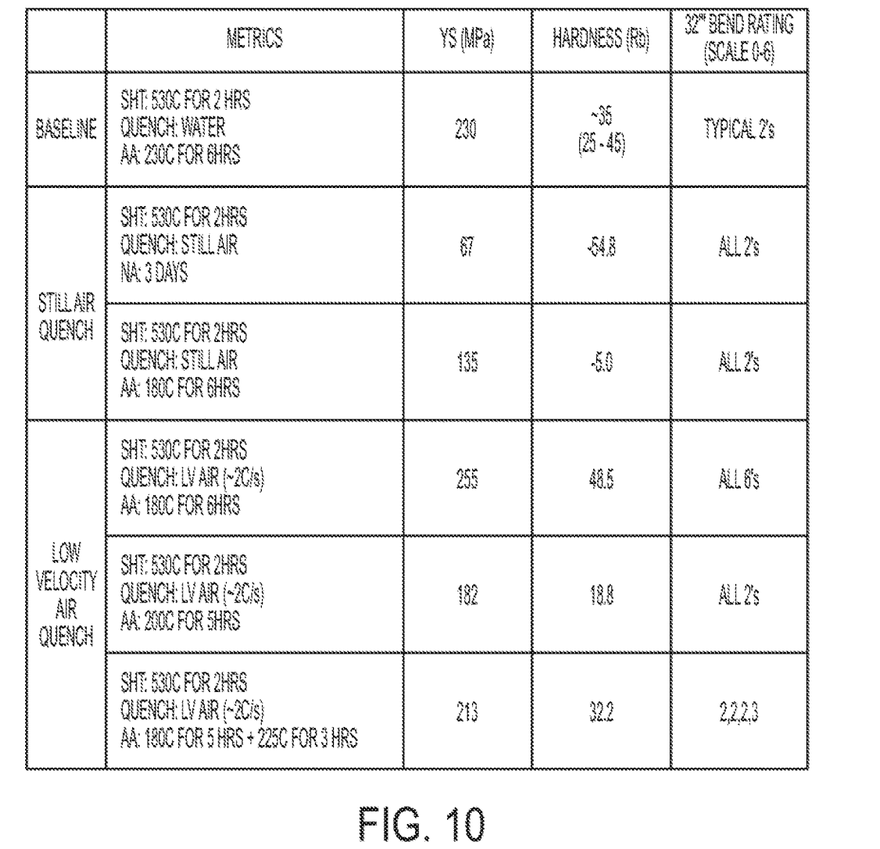
FIG. 10 is a table of experimental data including properties of water, still air, and low velocity air quenched components.

With reference to FIG. 10, a table is shown with experimental data for still and low velocity air quench test samples of a 6061 aluminum alloy. Data for a baseline water quench is also included for comparison. As shown, the still air quench results in relatively low yield strengths, for both natural aging and artificial aging. Even with precipitation hardening by artificial aging, the yield strength is still significantly lower than necessary for most structural reinforcement applications (e.g., at least 200 MPa). The low velocity (LV) air quench samples had higher yield strengths, however, they generally did not have both the requisite yield strength and bendability. For example, the first LV sample had a high yield strength, but very poor bendability (the higher the rating, the more cracked/damaged the sample is). The second LV sample had good bendability, but lower yield strength than generally required. The third LV sample met both the yield strength and bendability requirements, however, it required a longer artificial aging process than desired and may not be at least several standard deviations above the yield strength requirement.

Figure 11:
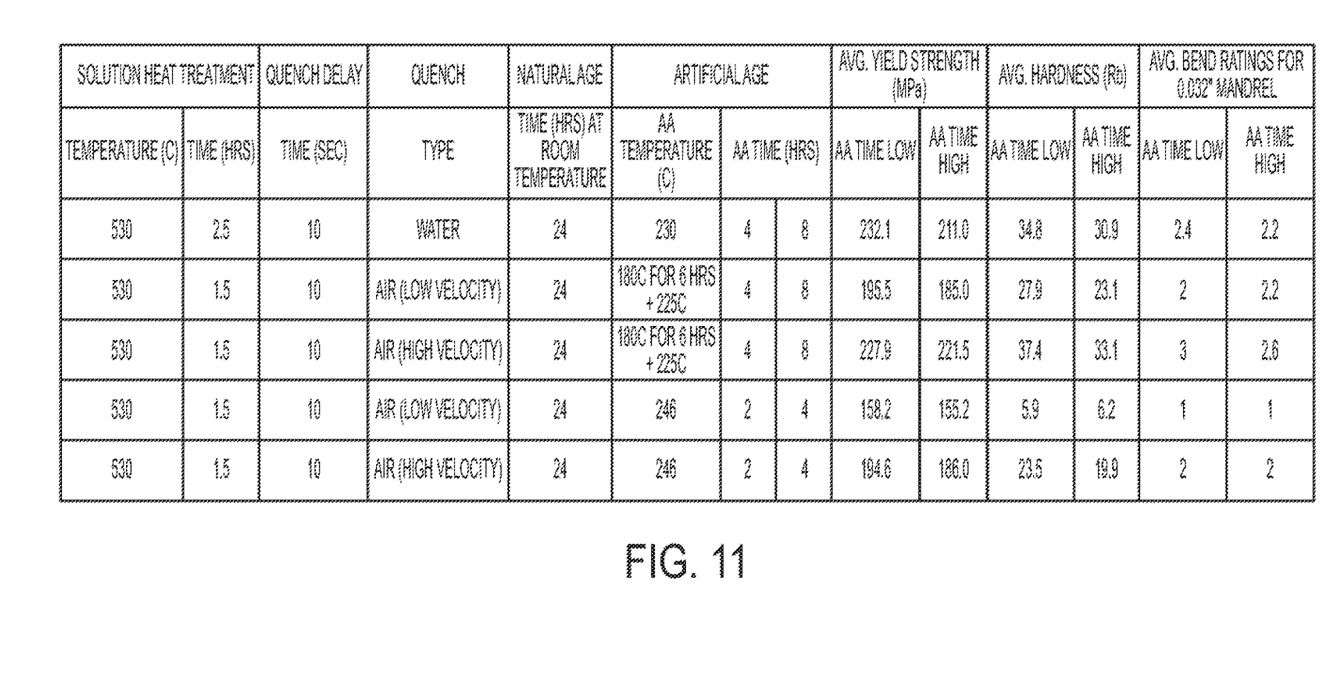
FIG. 11 is a table of experimental data including properties of water, low velocity, and high velocity air quenched components after various artificial aging processes.

With reference to FIG. 11, a table is shown with experimental data for low velocity (LV—about 2° C./s) and high velocity (HV—about 8-10° C./s) air quench test samples of a 6061 aluminum alloy. The LV and HV samples were also subjected to different artificial aging (AA) processes. As shown, the LV samples had consistently lower yield strength results than the HV samples, regardless of the AA process, and did not meet the goal of at least 200 MPa. The HV samples had higher yield strength results, and still maintained good bendability. The HV samples that had a two-step AA process had yield strengths significantly above the 200 MPa target. The HV samples having a one-step AA process were below the target, however, the sample with the shorter, 2-hour AA process was near the 200 MPa target.

Figure 12:
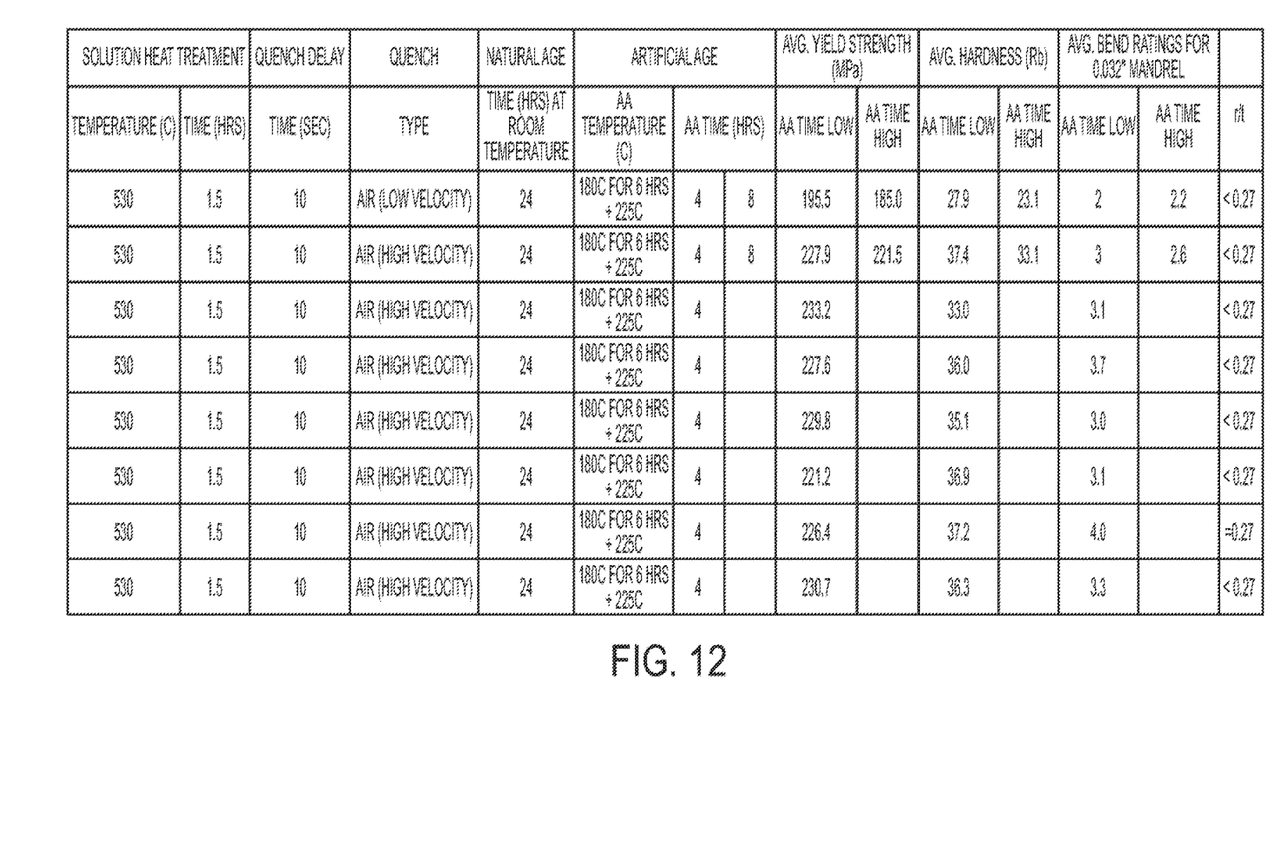
FIG. 12 is a table of experimental data including properties of low velocity and high velocity air quenched components after various two-step artificial aging processes.

With reference to FIG. 12, a table is shown with experimental data for low velocity (LV—about 2° C./s) and high velocity (HV—about 8-10° C./s) air quench test samples of a 6061 aluminum alloy. The first two rows are the same data as the two-step AA process samples in FIG. 11. The last six rows (e.g., samples 3-8) are all HV samples cooled using industrial scale 150 HP ducted fan air quenching systems and precipitation hardened using a two-step AA process. Samples 3 and 4 were of a vehicle component not shown in the Figures, while samples 5 and 8 were the component shown in FIGS. 6-7 and samples 6 and 7 were the component shown in FIGS. 8-9. Samples 3-8 all show yield strengths similar to the sample in row 2, and significantly above the 200 MPa target. Samples 3-8 had slightly lower bendability ratings, however, the bendability may be improved by lengthening the second step of the AA process (e.g., to 5 or 6 hours). As shown, all seven of the HV samples had an r/t ratio of less than or equal to 0.27, which is below the target of 0.3.

Figure 13:
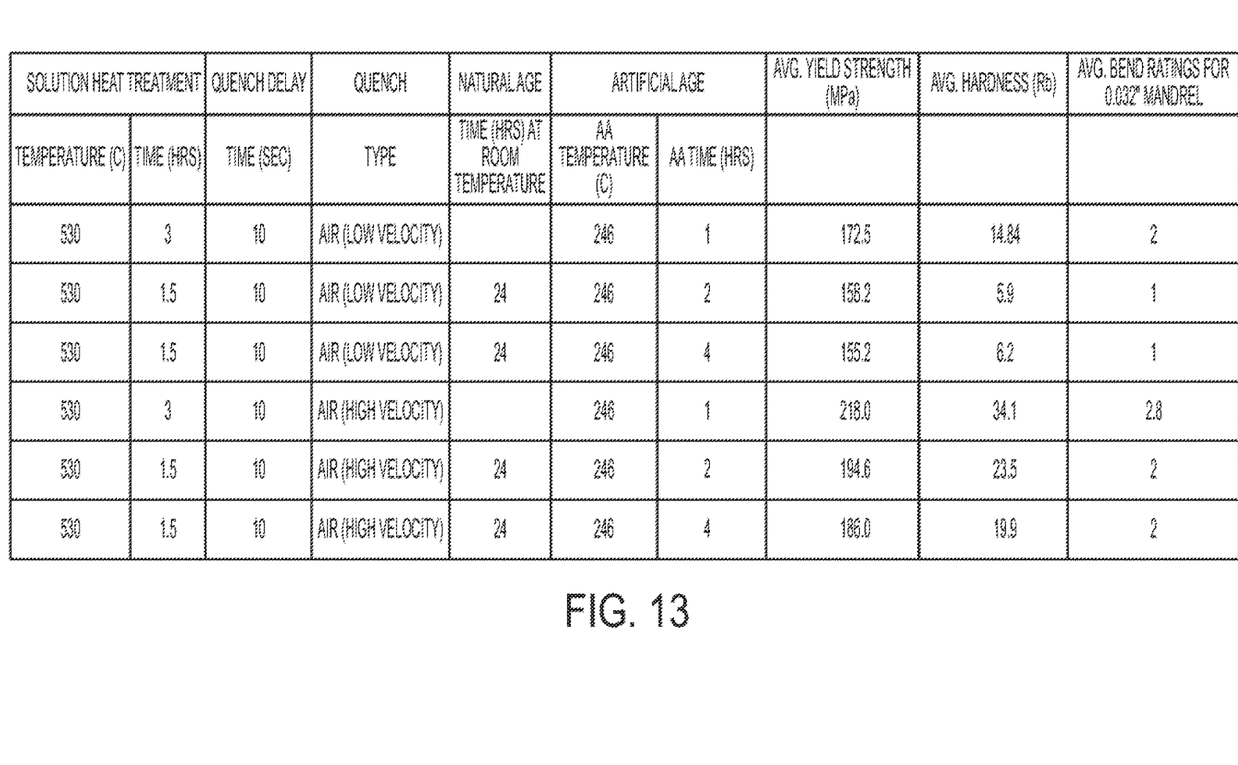
FIG. 13 is a table of experimental data including properties of low velocity and high velocity air quenched components after various one-step artificial aging processes.

With reference to FIG. 13, a table is shown with experimental data for low velocity (LV—about 2° C./s) and high velocity (HV—about 8-10° C./s) air quench test samples of a 6061 aluminum alloy. The LV and HV samples were precipitation hardened using a one-step AA process at 246° C. for varying lengths of time. This temperature is higher than conventional AA temperatures for 6xxx series aluminum alloys (e.g., about 180° C.). As shown, all of the LV samples had a yield strength significantly below the 200 MPa target, regardless of AA time. However, yield strength increased with shorter AA time. For the HV samples, the trend was the same, with a shorter AA time resulting in higher yield strengths. The HV sample with a one hour AA time surpassed the target yield strength and maintained good bendability. Accordingly, this data shows that a shorter, higher temperature, one-step AA process produces an air-quenched component with very good yield strength and bendability.

Figure 14:
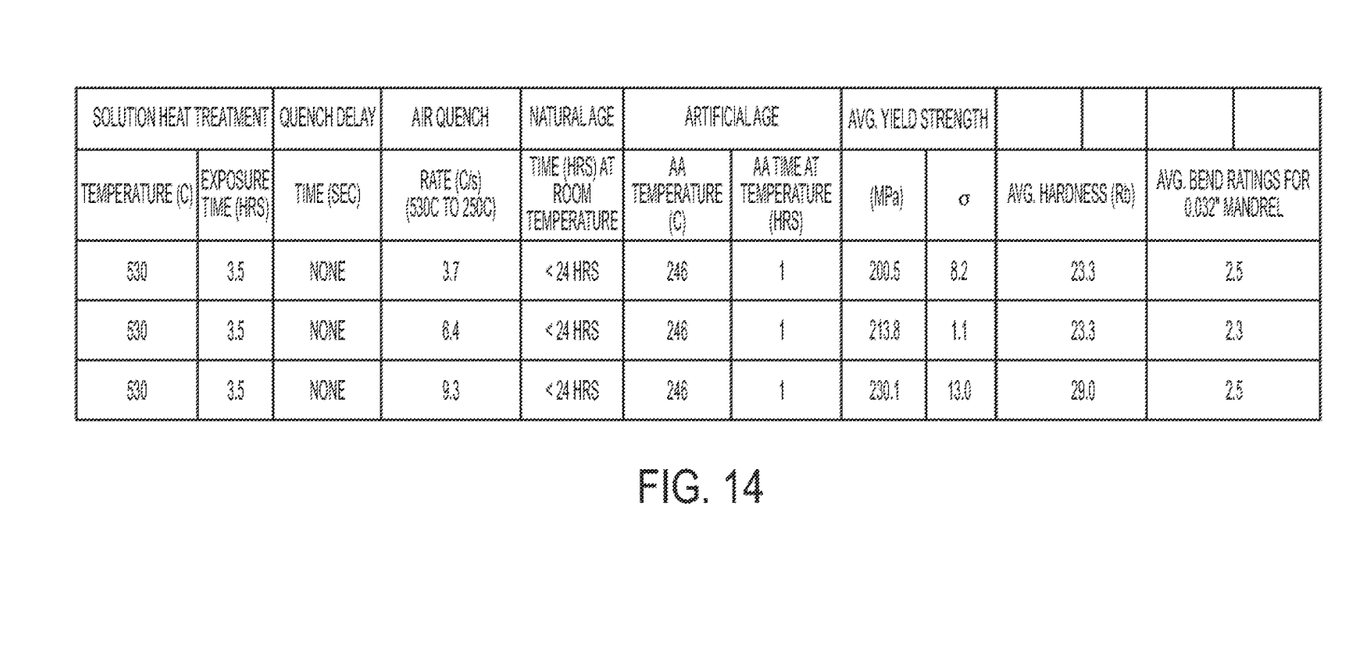
FIG. 14 is a table of experimental data including properties of components that were air quenched at different cooling rates and precipitation hardened using a one-step artificial aging process.

With reference to FIG. 14, a table is shown with experimental data for test samples of a 6061 aluminum alloy air-quenched at several different rates. The samples all had identical SHT and AA processes, with the only variable being quench rate. As shown, higher quench rates resulted in higher yield strengths. The lowest quench rate resulted in a yield strength right at the 200 MPa target. However, the standard deviation of 8.2 MPa means that the 3.7° C./s quench rate may not robustly produce components with the target strength. The higher quench rates resulted in samples with yield strengths above the target, with the 9.3° C./s quench rate providing a yield strength significantly above 200 MPa. All three quench rates resulted in samples the retained good bendability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of processing an air-quenchable aluminum alloy component, comprising:
   sequentially performing operations of
      progressive die stamping a sheet of an air-quenchable aluminum alloy to form a component,
      solution heat treating the component,
      air-quenching the component at a rate of 6° C./s to 25° C./s, and artificially aging the component, including heat treating the component at 235° C. to 255° C., to a yield strength of at least 200 MPa.

2. The method of claim 1, wherein the artificially aging includes artificially aging the component to have an r/t ratio of at most 0.3.

3. The method of claim 1, wherein the solution heat treating includes heat treating the component at 520° C. to 540° C.

4. The method of claim 1, wherein no liquid is used to quench the component.

5. The method of claim 1, wherein the air-quenching includes air-quenching the component at a rate of 8° C./s to 15° C./s.

6. The method of claim 1, wherein the air-quenching is performed through at least a temperature range of 475° C. to 290° C.

7. The method of claim 1, wherein the heat treating is performed for 0.5 to 2 hours.

8. The method of claim 1, wherein the heat treating is performed at 240° C. to 250° C. for 0.5 to 1.5 hours.

9. The method of claim 1, wherein the sheet is one of 6061, 6063, 6022, 6008, 6451, 6005, 7003, and 7005 aluminum alloy.

10. The method of claim 1, wherein the air-quenching does not distort the component by more than 0.7 mm.

11. A method of processing an air-quenchable 6xxx series aluminum alloy component, comprising:
sequentially performing operations of
progressive die-stamping a sheet of an air-quenchable 6xxx series aluminum alloy to form a component,
solution heat treating the component at a temperature from 520° C. to 540° C.,
air-quenching the component through at least a temperature range of 475° C. to 290° C., and
artificially aging the component, including heat treating the component at a temperature of 235° C. to 255° C. for 0.5 to 2 hours, to a yield strength of at least 200 MPa.

12. The method of claim 11, wherein the air-quenching includes air-quenching the component at a rate of 6° C./s to 25° C./s.

13. The method of claim 11, wherein the artificially aging includes artificially aging the component to have an r/t ratio of at most 0.3.

14. A method of forming a structural vehicle component, comprising:
sequentially performing operations of
stamping a sheet of an air-quenchable aluminum alloy in a progressive die to form a component having at least two non-coplanar surfaces,
solution heat treating the component,
air-quenching the component at a rate of 6° C./s to 25° C./s, and
artificially aging the component, including heat treating the component at 235° C. to 255° C., to a yield strength of at least 200 MPa and an r/t ratio of at most 0.3.

15. The method of claim 14, wherein the solution heat treating includes heat treating the component at 520° C. to 540° C.

16. The method of claim 14, wherein the air-quenching is performed through at least a temperature range of 475° C. to 290° C.

17. The method of claim 14, wherein the heat treating is performed for 0.5 to 2 hours.

* * * * *